Patented Apr. 19, 1949

2,467,689

UNITED STATES PATENT OFFICE 2,467,689

LANTHANUM SILICATE PHOSPHOR

Jan Theodoor Gerard Overbeek, Eindhoven, Netherlands, assignor to General Electric Company, a corporation of New York No Drawing. Application October 23, 1946, Serial No. 705,228. In Belgium May 1, 1945

Section 1, Public Law 690, August 8, 1946
Patent expires May 1, 1965

3 Claims. (Cl. 252—301.4)

This invention relates to fluorescent materials, that is, materials which when excited by radiation of a given wavelength emit radiations of other wavelengths. The material is suitable for use in combination with a gaseous electric discharge lamp, particularly a mercury vapor discharge lamp.

According to the present invention I have discovered a novel fluorescent material composed of the oxides of lanthanum, silicon and trivalent cerium, and more particularly, lanthanum silicate activated by cerium. The total quantity of cerium oxide is preferably equal to 0.1 to 30 mol per cent of the quantity of lanthanum oxide. A content of 6 mol per cent gives particularly good results. The material emits radiation having a peak of emission at about 4000 Angstrom units. It is particularly well suited for use in photoengraving.

The fluorescent material is excited by ultraviolet rays, particularly by rays of short wavelength. Such rays are emitted in large quantities by a discharge through mercury vapor at low pressures, particularly radiations of 2537 Angstroms.

An advantage of the material comprising the present invention is that its emission varies but slightly with temperature. This is obviously an important advantage since fluorescent materials must at times be so located with respect to the exciting radiations that they are subjected to appreciably high temperatures.

A preferred composition of the lanthanum silicate comprising the present invention is expressed by the formula $La_2Si_2O_7$. This, of course, corresponds to a mol ratio of one mol $La_2O_3$ to two mols $SiO_2$.

In preparing a fluorescent material according to the present invention, a mixture of oxides of lanthanum, silicon and cerium, or of compounds which decompose upon heating to yield those oxides, is heated in a non-oxidizing atmosphere, preferably a reducing atmosphere, to a temperature between 1200 and 1300° C. The reducing atmosphere may consist of a mixture of nitrogen and hydrogen. Compounds which may be employed to yield the oxides include carbonates and nitrates. For example, the material may be prepared from an intimate mixture of the following ingredients:

| | Grams |
|---|---|
| Lanthanum carbonate (54.22% $La_2O_3$) | 114.2 |
| Cerium carbonate (53.02% $Ce_2O_3$) | 6.19 |
| Silicic acid | 24 |

This mixture is heated for four hours in a nitrogen atmosphere at a temperature of 1280° C.

When excited by the mercury line radiation of 2537 Angstroms the product obtained by the above process glows with a blue light and also emits ultra-violet radiations, the maximum emission being at 4000 Angstroms.

What I claim as new and desire to secure by Letters Patent of the United States is:

1. Fluorescent lanthanum silicate activated by trivalent cerium in an amount of about 0.1 to 30 mol per cent of the lanthanum oxide in the lanthanum silicate.

2. The method of manufacturing a fluorescent material which comprises forming an intimate mixture of compounds of lanthanum, silicon and trivalent cerium, said compounds being selected from the group consisting of the oxides of lanthanum, silicon and trivalent cerium and compounds which upon heating decompose to yield the said oxides, the said compounds being present in proportions of approximately one mol $La_2O_3$ to two mols $SiO_2$ with $Ce_2O_3$ in an amount of 0.1 to 30 mol per cent of the $La_2O_3$, and heating the mixture in a reducing atmosphere at a temperature of approximately 1200 to 1300° C.

3. A fluorescent material consisting essentially of lanthanum silicate ($La_2Si_2O_7$) containing trivalent cerium in an amount of $Ce_2O_3$ of 0.1 to 30 mol per cent of the quantity of lanthanum oxide.

JAN THEODOOR GERARD OVERBEEK.

REFERENCES CITED

The following references are of record in the file of this patent:

UNITED STATES PATENTS

| Number | Name | Date |
|---|---|---|
| 2,049,765 | Fischer | Aug. 4, 1936 |
| 2,238,026 | Moore | Apr. 8, 1941 |

Certificate of Correction

Patent No. 2,467,689.  April 19, 1949.

JAN THEODOOR GERARD OVERBEEK

It is hereby certified that error appears in the printed specification of the above numbered patent requiring correction as follows:

Column 2, line 31, for the word "reducing" read *non-oxidizing*;

and that the said Letters Patent should be read with this correction therein that the same may conform to the record of the case in the Patent Office.

Signed and sealed this 22nd day of November, A. D. 1949.

[SEAL]

THOMAS F. MURPHY,
*Assistant Commissioner of Patents.*